US008520971B2

(12) United States Patent
Crandall et al.

(10) Patent No.: US 8,520,971 B2
(45) Date of Patent: Aug. 27, 2013

(54) DIGITAL IMAGE RESAMPLING

(75) Inventors: Richard E. Crandall, Portland, OR (US); Jason Alexis Klivington, Portland, OR (US); Rudolph van der Merwe, Portland, OR (US); Mark Alan Zimmer, Aptos, CA (US)

(73) Assignee: Apple Inc., Cupertino, CA (US)

( * ) Notice: Subject to any disclaimer, the term of this patent is extended or adjusted under 35 U.S.C. 154(b) by 407 days.

(21) Appl. No.: 12/895,764

(22) Filed: Sep. 30, 2010

(65) Prior Publication Data

US 2012/0082396 A1   Apr. 5, 2012

(51) Int. Cl.
G06K 9/32   (2006.01)
(52) U.S. Cl.
USPC ............................ 382/266; 382/299; 345/698
(58) Field of Classification Search
None
See application file for complete search history.

(56) References Cited

U.S. PATENT DOCUMENTS

| | | | |
|---|---|---|---|
| 4,876,509 A | 10/1989 | Perlmutter | |
| 5,327,257 A * | 7/1994 | Hrytzak et al. | 358/447 |
| 6,377,280 B1 | 4/2002 | Acharya et al. | |
| 6,424,749 B1 * | 7/2002 | Zhu et al. | 382/260 |
| 7,391,933 B2 * | 6/2008 | Wang et al. | 382/300 |
| 7,623,706 B1 * | 11/2009 | Maurer | 382/167 |
| 8,274,583 B2 * | 9/2012 | Zimmer et al. | 348/251 |
| 2003/0086007 A1 * | 5/2003 | Sasai | 348/240.2 |
| 2006/0227152 A1 | 10/2006 | Berenguer et al. | |
| 2006/0262994 A1 * | 11/2006 | Patera et al. | 382/276 |
| 2008/0291332 A1 * | 11/2008 | Messing et al. | 348/625 |
| 2010/0074552 A1 * | 3/2010 | Sun et al. | 382/264 |
| 2010/0092086 A1 * | 4/2010 | Lei et al. | 382/173 |

FOREIGN PATENT DOCUMENTS

EP   1947603 A2   7/2008

OTHER PUBLICATIONS

Teoh et al., "Investigation on Several Basic Interpolation Methods for the Use in Remote Sensing Application," Proceedings of the 2008 IEEE Conference on Innovative Technologies in Intelligent Systems and Industrial Applications, Jul. 12-13, 2008.*
Lehmann et al., "Survey: Interpolation Methods in Medical Image Processing," IEEE Transactions on Medical Imaging, vol. 18, No. 11, Nov. 1999.*
Dai et al., "Bayesian Wavelet Shrinkage With Edge Detection for SAR Image Despeckling," IEEE Transactions on Geoscience and Remote Sensing, vol. 42, No. 8, Aug. 2004.*
Chen, "Probability Density Function Estimation Using Gamma Kernels," Ann. Inst. Statist. Math., vol. 52, No. 3, pg. 471-480 (2000).*
Scharber, "Continued Fractions: A look at irrational precision," University of Minnesota, Morris, Math 4901 Spring 2009.*

(Continued)

*Primary Examiner* — Barry Drennan
*Assistant Examiner* — Andrew Moyer
(74) *Attorney, Agent, or Firm* — Fish & Richardson P.C.

(57) ABSTRACT

Systems, methods and computer program products are disclosed for resampling a digital image. According to an implementation, a source image can be presharpened and upsampled to a first upsampled image having a specified image size and a first level of presharpening. The source image is also presharpened and upsampled to a second upsampled image having the specified image size and second level of presharpening that is less than the first level of presharpening. The first and second upsampled images are deblurred. A binary edge mask image is generated from the deblurred, upsampled images. The binary edge mask image is dilated and blurred to generate a deep mask image. The first and second, deblurred upsampled images are blended together using the deep mask image.

34 Claims, 5 Drawing Sheets

(56) References Cited

OTHER PUBLICATIONS

Caruso and Postel, "Image Editing with Adobe Photoshop 6.0," RadioGraphics 2002; 22:993-1002.*

Shan et al., "Fast Image/Video Upsampling," ACM Transactions on Graphics, vol. 27, No. 5, Article 153, Dec. 2008.*

Wang and Zhang, "Progressive Switching Median Filter for the Removal of Impulse Noise from Highly Corrupted Images," IEEE Transactions on Circuits and Systems, vol. 46, No. 1, Jan. 1999.*

Yaroslaysky, "Boundary effect free and adaptive discrete signal sinc-interpolation algorithms for signal and image resampling", Applied Optics, vol. 42, No. 20, Jul. 10, 2003, pp. 4166-4175.

Aly et al., "Image Up-Sampling Using Total-Variation Regularization With a New Observation Model", IEEE Transactions on Image Processing, vol. 14, No. 10, Oct. 2005, pp. 1647-1659.

J. O. Smith and P. Gossett, A flexible sampling-rate conversion method, in Proceedings of the International Conference on Acoustics, Speech, and Signal Processing, San Diego, New York, Mar. 1984, vol. 2, pp. 19.4.1 19.4.2, IEEE Press, 4 pages.

* cited by examiner

DIGITAL IMAGE RESAMPLING

TECHNICAL FIELD

The disclosure generally relates to resampling digital images.

BACKGROUND

Modern digital photography equipment and related software editing applications have simplified capturing, viewing, storing and editing digital images. For example, a user may desire to resample a digital image to a larger or smaller size. Some digital images, however, include artifacts that may not be noticeable until the image is resampled to a different size, particularly upsampling the digital image to a larger size.

There are several conventional resampling techniques available for resampling a digital image that can help reduce artifacts. These conventional techniques, however, may remove fine detail from the image or introduce additional artifacts into the image.

SUMMARY

Digital resampling techniques are disclosed that produce high-quality scaling of bitmap images with varying degrees of smoothness and continuity, along with an improvement in perceived detail in the resampled image.

According to some implementations, a source image is presharpened at a first level of presharpening and upsampled to a first upsampled image having a specified image size. The source image is also presharpened at a second level of presharpening and upsampled to a second upsampled image having the specified image size, where the second level of presharpening is less than the first level of presharpening. The first and second upsampled images are deblurred. A binary edge mask image is generated from the deblurred, first upsampled image. The binary edge mask image is dilated and blurred to generate a deep mask image. The first and second, deblurred upsampled images are blended together using the deep mask image.

In some implementations, the upsampling steps can be implemented using a convolution kernel that is a locally damped sinc function. The local damping can be implemented by a cosine window function with a tunable contour.

In some implementations, resampling can be implemented efficiently on a computer system by converting irrational resampling ratios into rational numbers, rendering real time resampling coefficients to integers, normalizing the coefficients, setting coefficients with values below a predetermined value to zero and applying the coefficients to a source image using a circularly symmetric and separable kernel.

The disclosed implementations provide various advantages including but not limited to efficiently resampling a source image while minimizing unwanted image artifacts in the resampled image, such as "blocking" and "ringing."

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Exemplary Resampling Process

Figure 1:
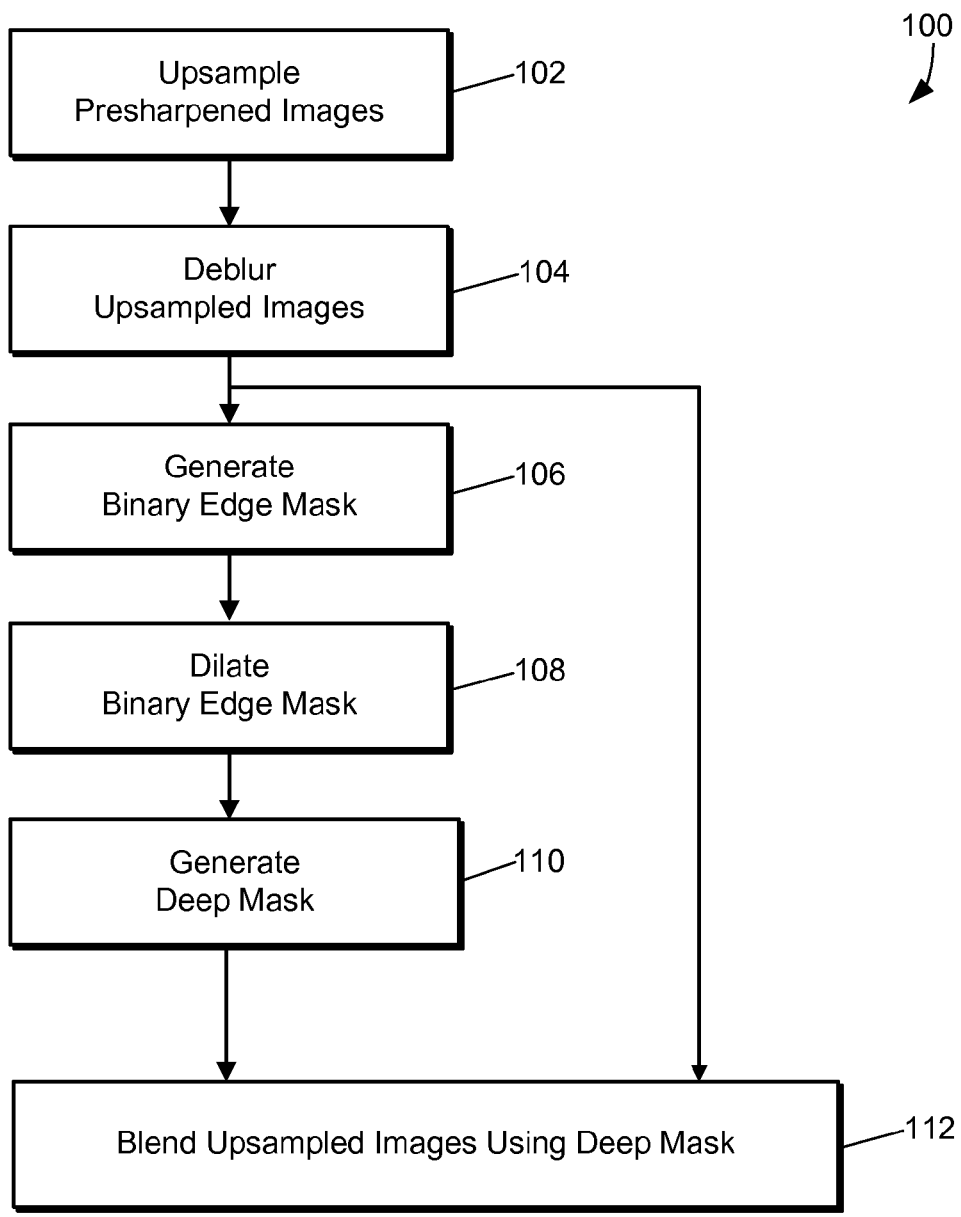
FIG. 1 is a flow diagram of an exemplary process for upsampling a digital image.

FIG. 1 is a flow diagram of an exemplary process 100 for upsampling a digital image. The process 100 can be implemented on a computer system using the architecture described in reference to FIG. 5. The process 100 can be implemented in an image processing or photo editing application, or in an operating system of a computer or other device, such as a smart phone, electronic tablet or any other device that processes digital images or video.

At step 102, an upsampling is performed on a source image to produce a first upsampled image having a specified image size. The size can be specified by a user or by an application. An upsampling ratio of the source image can be set to 2:1 for specified upsample ratios greater or equal than 2:1. For specified upsample ratios less than 2:1, a dilation factor can be used. Some examples of upsampling processes that can be used to upsample the source image include but are not limited to: Block spline, B-spline, Bilinear-2, Bicubic-6 spline and Cubic-W spline. Additionally, an upampling process can be used that uses a tunable cosine window function combined with a sinc function to reduce "ringing," as described in reference to FIG. 3.

In step 102, presharpening parameters are chosen to emphasize edges (e.g., by selecting appropriate coefficients of a high-pass kernel) in the source image which when upsampled produces an "edge-optimized" first upsampled image. Also at step 102, a second upsampled image is generated that is "field-optimized" using a level of presharpening that is less than the level used on the first upsampled image.

At step 104, deblur operations are applied to the first and second upsampled images to further sharpen the first and second upsampled images. For example, a Wiener deconvolution can be applied to the first and second upsampled images. In some implementations, more than one Wiener deconvolution pass can be applied to the first and second upsampled images to improve the sharpness of the upsampled images.

At step 106, a binary edge mask image is generated from the deblurred, first upsampled image to indicate edge regions in the first upsampled image. The binary edge mask image can be generated by applying a Gaussian blur filter to the deblurred, first upsampled image produced in step 104, followed by an edge detector process (e.g., a Canny edge detector). The combination of the upsampling process in step 102 and the Gaussian blur filter in step 106, allows for fractional-pixel edge position detection in the source image, thus providing a precise binary edge mask image.

At step 108, the binary edge mask image is dilated to a specified image size (e.g., using bilinear interpolation) to generate a deep mask image (as opposed to binary).

At step 110, a blur kernel (e.g., a disc blur kernel) is applied to the deep mask image to provide a more gradual transition between masking regions in the deep mask image.

At step 112, the deep mask image is used to blend the first and second upsampled images. The deep mask image minimizes blocking artifacts in the final upsampled image, resulting in a smooth and continuous, final upsampled image.

Exemplary Resampling System

Figure 2:
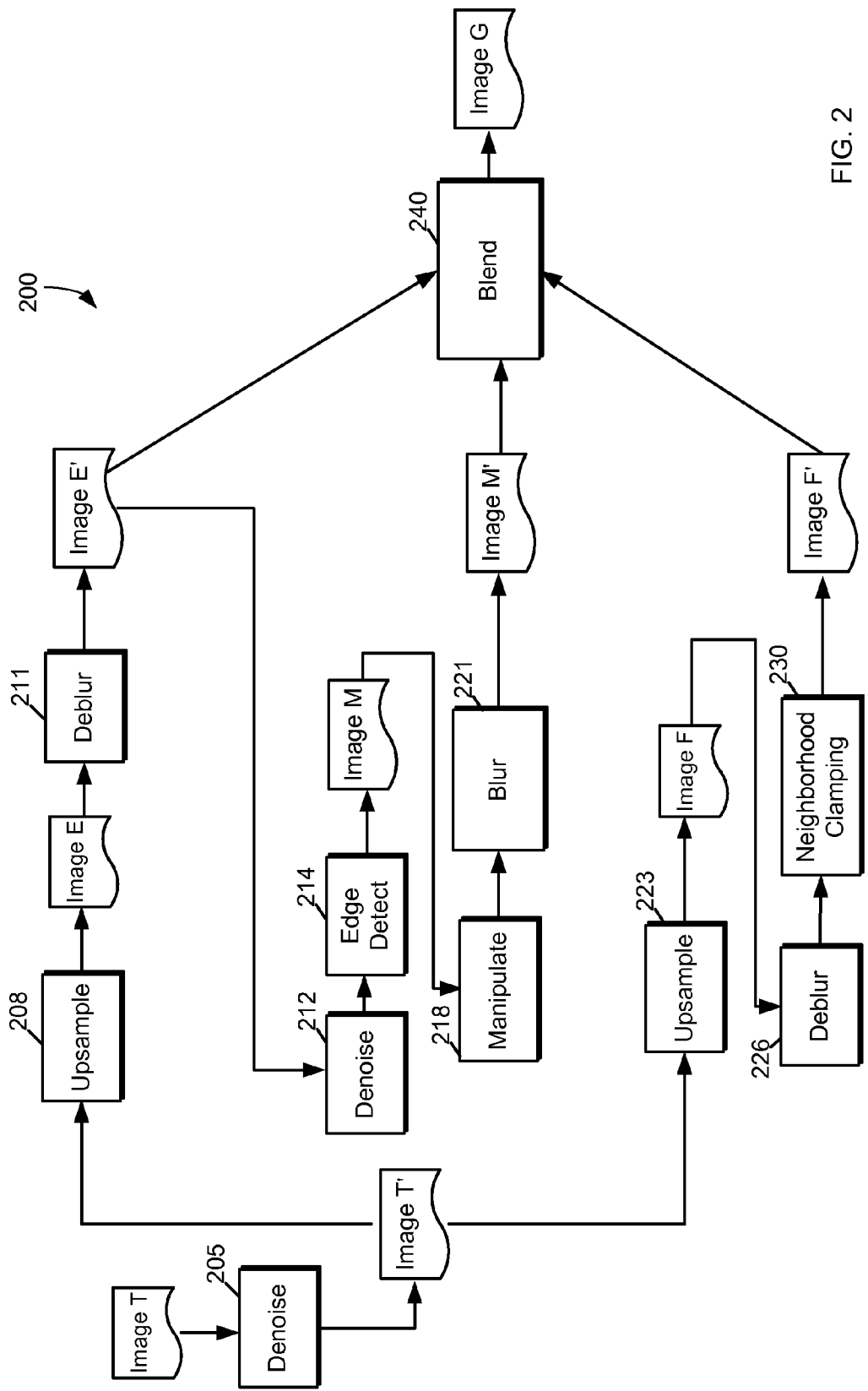
FIG. 2 is a flow diagram of another exemplary process for upsampling an image.

FIG. 2 is a flow diagram of another exemplary process 200 for upsampling a digital image. The process 200 includes the steps of process 100 and additional processing steps to further improve the appearance of the upsampled image.

At step 205, a denoising process can be optionally applied to a source image T to produce an image T'. In some implementations, the denoising process is a non-local (NL) means process.

At step 208 the image T' is upsampled to produce an image E. Various processes can be used to upsample the image T'. For example, the image T' can be upsampled using known upsampling processes (e.g., B-spline). A suitable upsampling process to scale image T' while minimizing "ringing" is discussed in more detail in reference to FIG. 4. In step 208, presharpening parameters are chosen to emphasize edges in the upsampled image E, such that upsampled image E is "edge-optimized."

At step 211, the "edge-optimized" image E is deblurred with a deconvolution, such as a Wiener deconvolution, to produce an image E'. In some examples, multiple passes of a deconvolution can be performed. For example, two passes of Wiener deconvolution can be performed. Applying a second pass of Wiener deconvolution, immediately after the first pass (and with a radius proportional to the upsample ratio) will produce a sharper image while keeping artifacts to a minimum. In some examples, multiple passes can also be reduced into a single deconvolution pass with a kernel generated from a convolution of two separate kernels: one for each pass. The parameters of the Wiener deconvolution can be set to aggressively sharpen edges.

At step 212, denoising, such as a NL means denoising process, is applied to the image E'. Denoising parameters can be set to heavily denoise, which can reduce fine detail but leave edges essentially intact.

At step 214, an edge detector, such as a Canny edge detector, is applied to image E' to produce a binary edge mask image M. At step 218, the edge mask image M is manipulated (e.g., dilated) to include mask pixels adjacent to currently set pixels to expand the edge mask to cover pixels immediately adjacent to edges.

At step 221, a blur, such as a Gaussian blur kernel is applied to the edge mask image M, which produces a deep mask image M'. Optionally, a Gamma curve can be applied to the edge mask image M. The deep mask image M' produces a smooth transition on either side of edges identified by the edge detector.

At step 223, the image T' is upsampled to produce an image F. This is shown as a separate step but can be performed at the same time as step 208. Like step 208, various upsampling algorithms can be used to upsample the image T'. For example, the image T' can be upsampled with B-spline scaling. A lower level of high-pass presharpening is used on image T' than on image E in step 208 to keep from distorting fine detail, and thus provide a "field-optimized" upsampled image. An upsampling technique that reduces "ringing" is discussed in reference to FIG. 4.

At step 226, a deconvolution is applied to image F. For example, a Wiener deconvolution can be applied to the image F. The parameters for the deconvolution can be set to minimize ringing and to better produce fine image detail at the expense of sharp edges.

At step 230 a technique call "neighborhood clamping" can be applied to image F to produce an image F', which is discussed in more detail below in reference to FIG. 4.

At step 240, the image E' and the image F' are blended using the deep mask image M', to produce a final resampled image, G. For example, image E' and the image F' can be blending using the deep mask image M' using the following equation:

$$G(x,y) = M_n'(x,y)E'(x,y) + (1 - M_n'(x,y))F'(x,y) \quad [1]$$

The denoising process is used in the upsampling steps 205, 212 to remove blocking artifacts. Blocking artifacts (e.g., JPEG blocking artifacts), though sometimes difficult to detect at their original scale, can produce prominent undesirable features when an image is upsampled. While all but the worst blocking artifacts tend to be smoothed by upsampling, and don't appear significantly worse than in the source image, it is high-frequency speckling or "mosquito noise" that appears along sharp edge features that is most offensively amplified. A basic NL means denoising process can reduce these artifacts. The tuning parameters for the NL denoising process can be selected to reduce undesirable softening, smoothing, and loss of high-frequency detail in other regions of the digital image.

The Wiener deconvolution in steps 211, 226, aids in producing sharper edges and perceived detail, but can produce some unpleasant "ringing," "clamping," and "banding" artifacts. The NL means denoising process can reduce high-frequency noise and some of the "ringing" and "clamping" artifacts produced by the Wiener deconvolution steps 211, 226.

To selectively address just the high-frequency noise the following measures can be defined. First let P(x, y) represent the pixel at position (x, y) in the source image, and denote by N(x, y) the 3×3 pixel neighborhood centered at (x, y). Further, denote by N' (x, y) the neighborhood, but with the center point at (x, y) omitted. Let V' (x, y) be the variance of the neighborhood, N' (x, y).

Then, let $D_n(x, y)$ denote the pixel in the neighborhood N' (x, y) with the nth closest pixel value to the pixel (x, y). Finally, we define a noise measure $M_n(x, y)$ as $$M_n(x, y) = \frac{G|P(x, y) - D_n(x, y)|^\alpha}{V'(x, y)^\rho + \varepsilon}, \quad [2]$$

with the restriction that pixel values be normalized within the range [0,1], and $M_n$ values clamped to the range [0,1]. The values G, α, and ρ provide tuning parameters for the process. Example values for these parameters are $G = 4 \times 10^{-4}$ α=3, ρ=5 and $\varepsilon = 2 \times 10^{-9}$. The value $M_2$ (x, y) is a good approximate measure of the likelihood that a given pixel at (x, y) is a blocking artifact. A lower variance value, V' (x,y), which indicates a pixel with a smooth surrounding region, within which artifacts will be more noticeable, will result in a higher M value. A higher $D_n$ value indicates a pixel that differs significantly from (all but n−1 of) its surrounding pixels. Thus the $M_n$ measure of equation [2] indicates pixels that differ significantly from their smooth surroundings. A Gaussian blur kernel can be applied to the $M_n$ image (step 221) to produce the deep mask image $M_n'$, which indicates areas of high-frequency noise and their immediate neighborhoods. By applying a NL means denoising process to the source image, an image that has reduced noise is generated.

Exemplary Upsampling Process To Reduce Ringing

Various resampling processes can be used to upsample or downsample a digital image in steps 102, 202, 223. For example, a B-spline upsampling process can be used. According to some implementations, a digital image can be resampled with an algorithm that includes a convolution damped with a tunable filter. For example, a damped convolution can be defined by the following kernel, h(n), having a convolution that is locally damped:

$$h(n) = \cos^{\omega}\left(\frac{\pi n}{2m}\right) \cdot \frac{\sin(kn)}{kn}, \quad [3]$$

where the kernel h(n) is defined by the dilation k determined by a specified resampling ratio, and where h(n)=0 if |n|>m.

The damped convolution kernel can be applied to a digital image in two orthogonal directions (e.g., x, y directions). When n reaches +/−m, the sinc function is nullified by the locally damped cosine window. Thus, the h(n) kernel is damped by a cosine window with a tunable contour via the power ω. The damping filter with power w is used to minimize "ringing." In some examples, the power ω can be different for upsample than for downsample. For example, for upsample ω can be set to 3 and for a downsample ω can be set to 4.

Efficient Implementation of Resampling on Computer System

Figure 3:
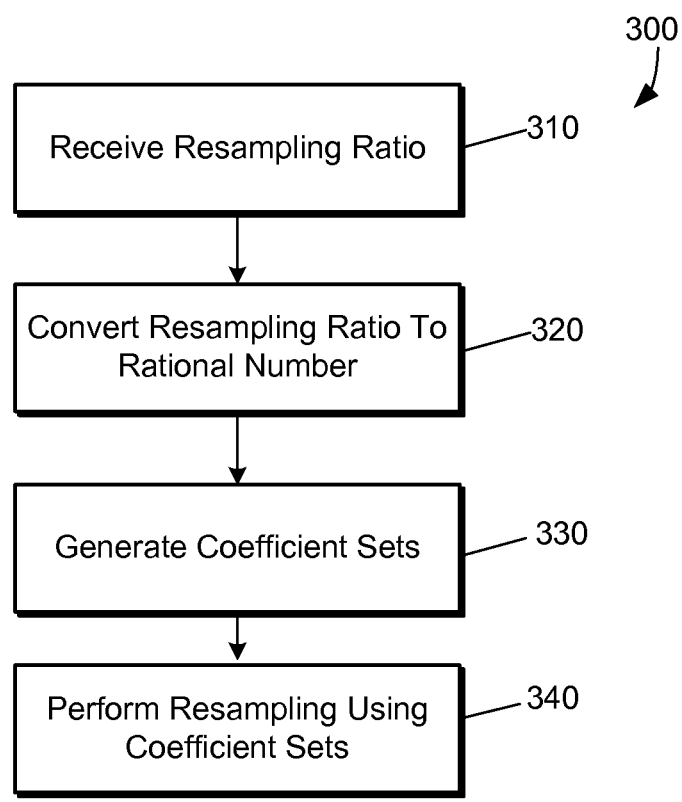
FIG. 3 is a flow diagram of an exemplary process for efficiently implementing a resampling process on a computer system.

FIG. 3 is a flow diagram of an exemplary process for efficiently implementing the resampling processes of FIGS. 1 and 2 on a computer system. At step 310, a resampling ratio for resampling an image is received from a user. The received resampling ratio can be an arbitrary number including an irrational number or a rational number At step 320, an arbitrary resampling ratio can be converted into a simplified rational approximation so that coefficients of the resampling kernel h(n) to be applied to the digital image are limited to a finite number of coefficients (e.g., 9 coefficients) that can be stored in a look-up table. The simplified rational approximation will have a smaller period which will result in less obvious patterns in the resampled image. Moreover, resampling using simplified rational numbers results in repeating coefficient sets, which reduces the number of coefficients that are necessary for resampling the image.

In some examples, converting the arbitrary resampling ratio into a rational numerical representation includes using a continued fraction representation of the received resampling ratio. If necessary, the continued fraction representation can be truncated to provide a simplified approximation with minimal error. For example, an irrational number can be approximated using continued fractions to produce a more simplified rational fraction for use in the resampling algorithm. Continued fractions can be used to determine simplified approximations of irrational or unwieldy rational numbers to eliminate large patterns that can result from the numerators of the rational numbers. For example, a resampling ratio of 0.245 is a rational number that can be represented by 49/200. In this form, 49/200, although rational, can produce large 49-pixel patterns in a resampled image, where the result pixels are alternately sharp and blurry over noticeable regions. Continued fractions can be used to produce a simplified approximation of 0.245. As a continued fraction 0.245 can be represented as $$\cfrac{1}{4 + \cfrac{1}{12 + \cfrac{1}{4}}},$$

where truncated approximations of this continued fraction include ¼ and 12/49, each of which are simplified rational number approximations of 0.245 with smaller numerators and thus smaller repeating patterns.

At step 330, equation [3] can be evaluated to produce coefficient sets for each destination pixel. The coefficient sets can be used to form a kernel that is circularly repeating and separable to reduce the number of calculations during resampling. In some implementations, the coefficients can be normalized to prevent the resulting resampled image from being brightened or dimmed. Normalization can be accomplished by dividing each un-normalized coefficient by a sum of the un-normalized coefficients. In some implementations, the coefficients can be rendered into integers to allow efficient integer math to be used in the resampling process.

At step 340, resampling is performed on the digital image. The resampling kernel h(n) (e.g., 9 coefficients) is applied to the neighborhood of 9 samples surrounding each designated sample in the source image and the result is written to a corresponding destination pixel in a buffer. For each designated sample in the source image, the proper set of 9 coefficients is chosen, based on the residue of the destination pixel offset, modulo the numerator of the ratio number. The resampling can be performed separably by processing the rows of the source image first, followed by the columns of the source image, or vice-versa. For processing pixels on an edge of the image, the edge pixel can be replicated (e.g., replicated to produce 4 additional duplicate samples) so that the convolution kernel can be applied to the edge pixel. In some implementations, very small coefficients can be set to zero to reduce noise in the resulting resampled image.

The following is example code for computing coefficient sets (for upsampling and downsampling) using the kernel of equation [3], where for upsampling ω is set to 3 and ω is set to 4 for downsampling.

```
void computeDownsampleCoefficients(int numer, int denom)
{
    int i, index, centernumer, numeroffset, numerator;
    double sum, normalizer;
    double unnorm[9], double norm[9];
    centernumer = 0;
    numeroffset = -4*numer;
    for (index = 0; index < numer; index++)
    {
        sum = 0.0;
        for (i = 0, numerator = centernumer + numeroffset; i < 9; i++,
    numerator += numer)
        {
            unnorm[i] = sincp((double)numerator /
            (double)denom)
            if (fabs(unnorm[i]) < 0.00006)
                unnorm[i] = 0.0;
            sum += unnorm[i];
        }
        normalizer = 1.0 / sum;
        for (i = 0; i < 9; i++)
```

-continued

```
        norm[i] = unnorm[i] * normalizer;
        centernumer -= denom - numer;
        if (centernumer*2 + numer < 0) // < -½
            centernumer += numer;
    }
}
void computeUpsampleCoefficients(int numer, int denom)
{
    int i, index, centernumer, fracdenom, numeroffset, numerator;
    double sum, normalizer;
    double norm[7], unnorm[7];
    fracdenom = numer*2;
    centernumer = numer - denom;
    numeroffset = -3*fracdenom;
    for (index = 0; index < numer; index++)
    {
        sum = 0.0;
        for (i = 0, numerator = centernumer + numeroffset; i < 7; i++,
numerator += fracdenom)
        {
            unnorm[i] = sincp2((double)numerator /
                (double)fracdenom, 3);
            if (fabs(unnorm[i]) < 0.00006)
                unnorm[i] = 0.0;
            sum += unnorm[i];
        }
        normalizer = 1.0 / sum;
        for (i = 0; i < 7; i++)
            norm[i] = unnorm[i] * normalizer;
        centernumer += (numer - denom) * 2;
        if (centernumer >= numer) // 1/2
            centernumer -= fracdenom;
    }
}
double sincp2(double x, unsigned int stretch)
{
    double y = M_PI*x, c;
    c = cos(y*(1.0/(double)(2*stretch)));
    if(x == 0.0)
        return 1.0;
    return c*c*c*(sin(y) / y);
}
double sincp(double x)
{
    double y, c;
    y = M_PI * x;
    c = cos(y * 0.125);
    if(x == 0.0)
        return 1.0;
    return c*c*c*c * sin(y) / y;
```

Neighborhood Clamping

In some implementations, resampling processes can exhibit different and often undesirable edge behaviors. For example, some resampling processes exhibit "ringing." Some processes can produce soft and blurry edges. Also, according to some implementations, a presharpening can be performed on a source image. Various techniques for sharpening can be used such as by performing an unsharp mask or a high-pass filter with a kernel size dictated by parameters such as spline basis order and upscale factor. Presharpening can help enhance the sharpness of upsampled images. Excessive presharpening, however, can also lead to undesirable effects such as "ringing" artifacts.

To alleviate "ringing" a technique called "neighborhood clamping" can be used. In a given dilated image, a given pixel's base coordinates in the source image can be defined by: x:=floor(T), y:=floor(U), where x and y are integer coordinates of a pixel in the original image that is being resampled, and T and U are contraction coordinates (real floating point numbers). Given directional dilation factors as real (floating-point) numbers $D_x, D_y \geq 1$, we presume that an original w×h (width-by-height) image can be transformed into new, larger dimensions W:=ceiling($wD_x$), H:=ceiling($hD_y$). For pixel coordinates (and so integer pairs) X∈[0, W−1], Y∈[0, H−1] we may define the contraction coordinates T and U as real numbers (float):

$$T := \frac{X + \frac{1}{2}}{D_x} - \frac{1}{2}, \qquad [4]$$

$$U := \frac{Y + \frac{1}{2}}{D_y} - \frac{1}{2},$$

by which we can create the base coordinates as integers x:=floor(T), y:=floor(U). For spline algebra in particular, we typically need the fraction values t:=T−x, u:=U−y. This important (t, u) parameter pair can be used to determine parametric surface that connects, say, a quad of original-image pixel values as (t, u) runs over the unit real square. In this way, a spline can be thought of as a collection of "boatsails" that connect lower-resolution images.

The surrounding neighborhood from the source image, then, is the four pixels at positions (x, y), (x, y+1), (x+1, y) and (x+1, y+1), which correspond to the corners of the "boatsail" that contains the upsampled pixel.

For a given pixel, p, in the dilated image at position (x, y), a limitation can be imposed that the pixel value not exceed the bounds of the corners of the "boatsail" defined by the bounding values from the source neighborhood:

$$p_{min} = \min(B[x,y], B[x+1,y], B[x,y+1], B[x+1,y+1]), \qquad [5]$$

$$p_{max} = \max(B[x,y], B[x+1,y], B[x,y+1], B[x+1,y+1]), \qquad [6]$$

$$p' = \min(p_{max}, p), \qquad [7]$$

$$p = \max(p_{min}, p'), \qquad [8]$$

If the constraints of equations [5]-[8] are applied, the "ringing" effects can be minimized or eliminated. When combined with aggressive presharpening, "neighborhood clamping" can produce smoothly continuous, sharp edges that are otherwise unattainable with conventional techniques, particularly along curving edges. Unfortunately, this is often at the expense of subtle detail, creating an image that suffers from excessively flat, cartoonish field regions and blocking artifacts.

To reduce the cartoonish flattening effect of "neighborhood clamping," the bounding parameters can be relaxed. The neighborhood bounds can be expanded by a variance factor, which is a function of the variance of the neighborhood of pixels in the source image. For an upsampled pixel p at position (x, y) in the image, with neighborhood size parameter m, we define $$\mathrm{Var}(x,y,m) = \mathrm{Var}(W), W \in \{B[r,s]\}, (x-m) < r <= (x+m), (y-m) < s <= (y+m), \qquad [9]$$

where (x−m)<r<=(x+m) and (y−m)<s<=(y+m). Then we define revised clamping constraints:

$$p_{min} = \min(B[x,y], B[x+1,y], B[x,y+1], B[x+1,y+1]) - \alpha \mathrm{Var}(x,y,m), \qquad [10]$$

$$p_{max} = \max(B[x,y], B[x+1,y], B[x,y+1], B[x+1,y+1]) + \alpha \mathrm{Var}(x,y,m), \qquad [11]$$

with tuning parameters α and m, which allow for regions with higher complexity and detail to have greater clamping bounds. This minimizes "ringing" in otherwise smooth regions of the image without flattening detail in regions of higher complexity.

Figure 4:
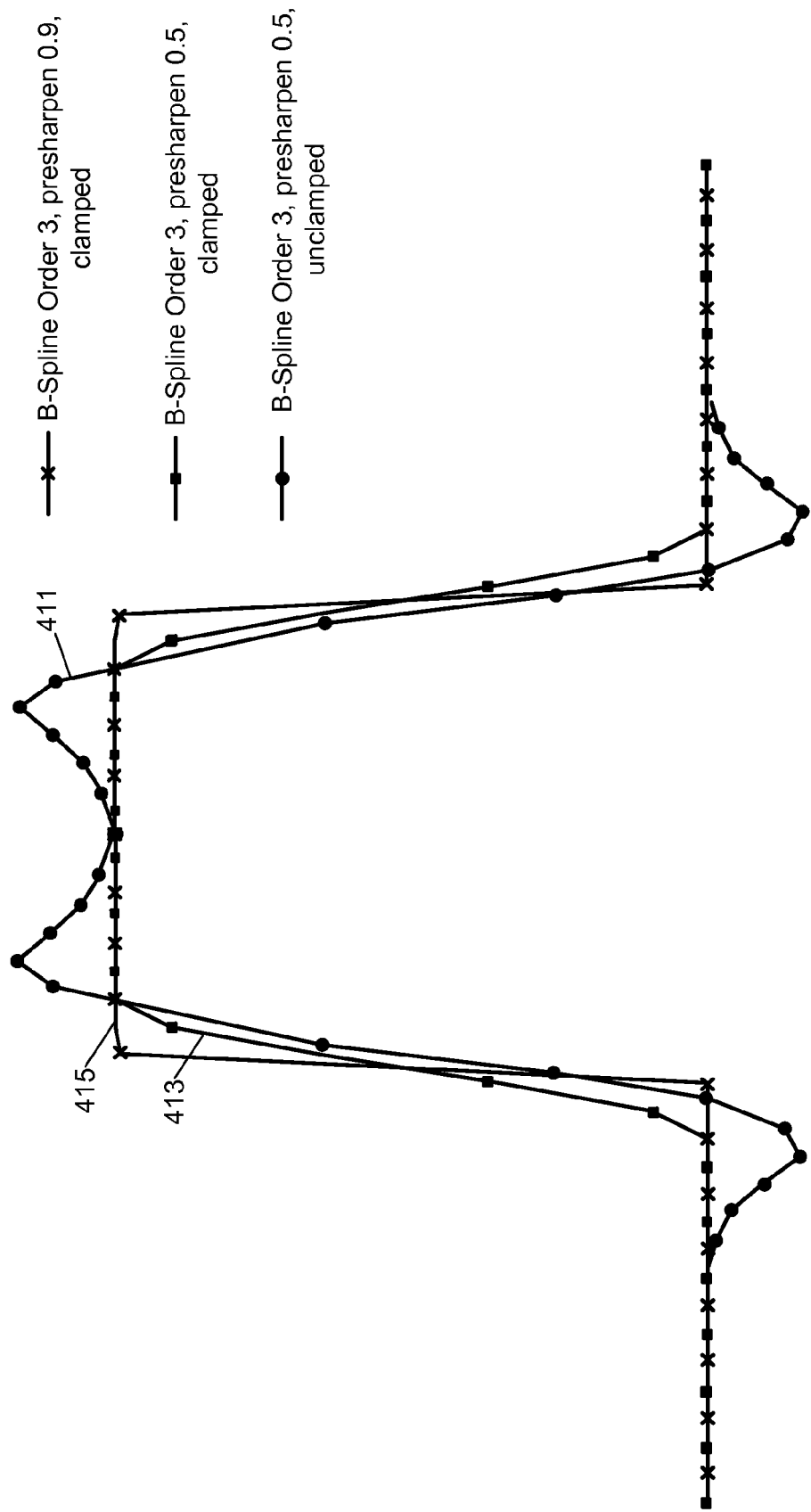
FIG. 4 is a graph illustrating the effects of clamping and varied presharpening when combined with B-spline window upsampling.

FIG. 4 is a graph illustrating the effects of clamping and varied presharpening when combined with B-spline upsampling. Graphed function 411 shows the effects due to ringing artifacts in unclamped functions. Graphed function 413 shows ringing minimized when the same function is clamped. For example, graphed function 411 is an unclamped B-spline Order 3 upsampling of an image presharpened at a value of 0.5. Graphed function 413 is a clamped B-spline Order 3 upsampling of the same image with presharpened at a value of 0.5. Compared with graphed function 411, the ringing in function 413 is minimized by clamping. Graphed function 415 is the same function as graphed function 413 except that it is presharpened to a value of 0.9 (increased sharpening). Thus the graphed functions illustrate that clamping reduces "ringing" on aggressively presharpened images.

Exemplary System Architecture

Figure 5:
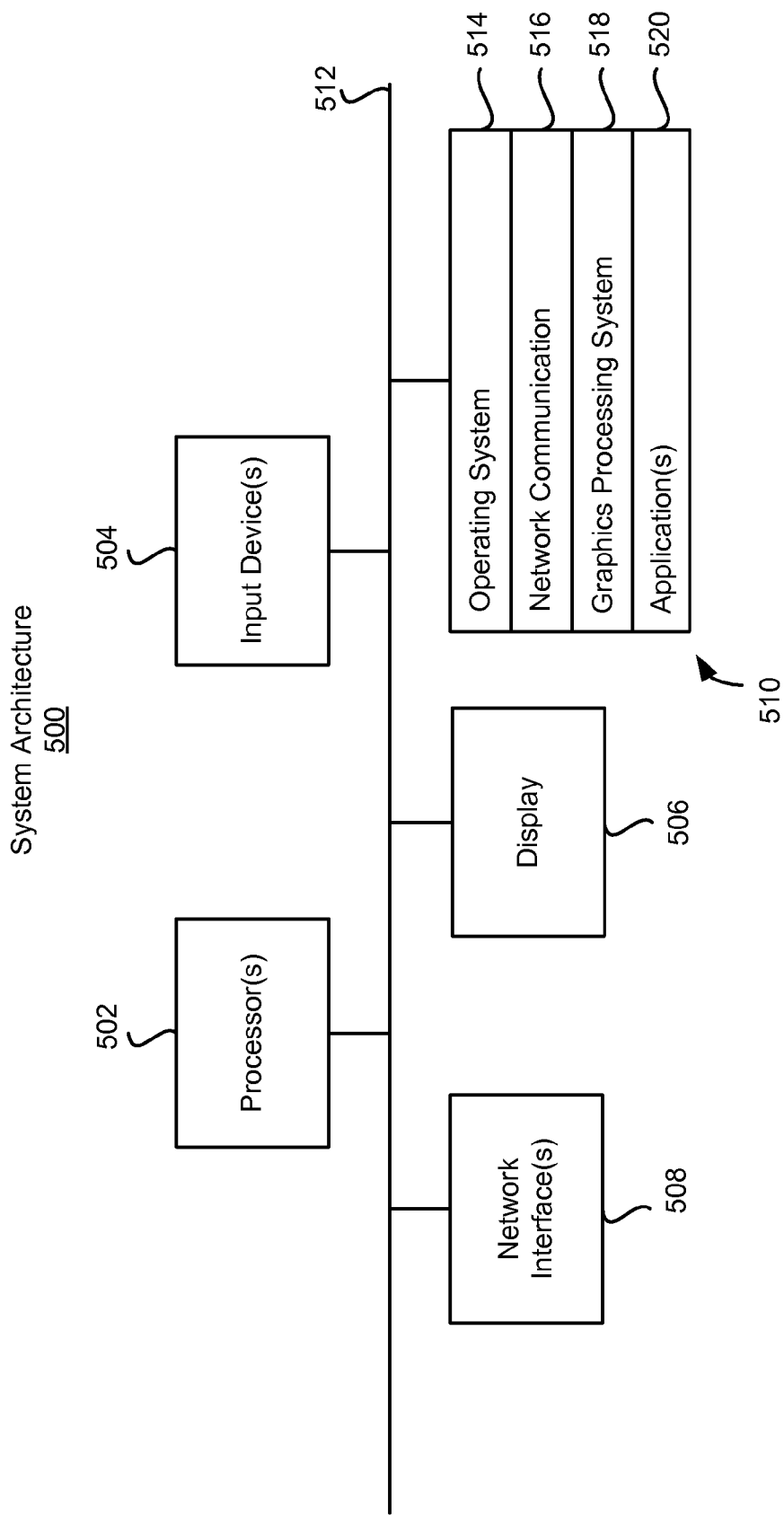
FIG. 5 is a block diagram of an exemplary system architecture implementing digital image resampling according to FIGS. 1-4.

FIG. 5 is a block diagram of an exemplary system architecture implementing resampling algorithms according to FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire. Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.).

Computer-readable medium 510 can include various instructions 514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics and image processing capabilities. For example, the graphics processing system 518 can implement the resampling processes, as described with reference to FIGS. 1-4.

Application(s) 520 can be an image processing application or any other application that uses the resampling processes described in reference to FIGS. 1-4, such as a photo or video editor. The resampling processes can also be implemented in operating system 514.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method of resampling a digital image, the method comprising:
   presharpening a source image using a first level of presharpening to a first presharpened image, and presharpening the source image using a second level of presharpening that is less than the first level of presharpening to a second presharpened image;
   upsampling the first presharpened image to a first upsampled image having a specified image size, and upsampling the second presharpened image to a second upsampled image having the specified image size, wherein the upsampling of the first and second presharpened images is performed using a damped, tunable convolution kernel h(n) defined by:

$$h(n) = \cos^\omega\left(\frac{\pi n}{2m}\right) \cdot \frac{\sin(kn)}{kn},$$

where k comprises a dilation determined by an upsampling ratio of the first and second presharpened images, m is the value of n where the sinc function is nullified, and ω is a contour tuning parameter;
   deblurring the first upsampled image;
   deblurring the second upsampled image;
   generating a binary edge mask image from the deblurred, first upsampled image;
   dilating the binary edge mask image;
   blurring the dilated binary mask image to provide a deep mask image; and
   blending the first and second, deblurred upsampled images into an upsampled source image using the deep mask image.

2. The method of claim 1, further comprising bounding a value of an upsampled pixel in the second upsampled image within a maximum and a minimum based on values of pixels in a neighborhood of pixels for the upsampled pixel.

3. The method of claim 2, further comprising adjusting the second upsampled image based on a variance factor defined by a variance of the neighborhood of pixels.

4. The method of claim 1, wherein dilating the binary edge mask image includes adding mask pixels adjacent to currently set pixels by expanding the binary edge mask image to cover pixels immediately adjacent to edges.

5. The method of claim 1, further comprising denoising the source image prior to the presharpening of the source image to the first and second presharpened images.

6. The method of claim 1, wherein blurring the dilated binary edge mask image includes blurring using a Gaussian blur.

7. The method of claim 6, further comprising applying a Gamma curve to the dilated binary edge mask image.

8. The method of claim 1, where blending the first and second, deblurred upsampled images using the deep mask image into the upsampled source image G(x, y) is performed according to the following equation $$G(x,y)=M_n'(x,y)E'(x,y)+(1-M_n'(x,y))F'(x,y),$$

where the first deblurred, upsampled image comprises a function defined by E'(x, y), the second, deblurred, upsampled image comprises a function defined by F'(x, y), and the blurred binary mask comprises a function defined by M'(x, y).

9. The method of claim 1, wherein generating a binary edge mask image from the deblurred, first upsampled image comprises denoising the deblurred, first upsampled image.

10. The method of claim 1, wherein deblurring the first upsampled image or the second upsampled image includes deblurring using a Wiener deconvolution.

11. The method of claim 1, wherein
    the contour tuning parameter used for the upsampling of the first and second presharpened images is larger than one, ω>1.

12. The method of claim 1, further comprising:
    receiving an upsampling ratio for upsampling the first and second presharpened images that is an irrational number;
    converting the upsampling ratio into a rational number based on a continued fraction representation of the upsampling ratio; and
    determining upsampling coefficients for a source pixel in the source image based on the converted upsampling ratio.

13. The method of claim of claim 12, further comprising:
    rendering the coefficients into integers.

14. The method of claim 12, further comprising:
    normalizing the coefficients; and
    setting coefficients below a predetermined value to zero.

15. A method of upsampling a digital image, the method comprising:
    upsampling a source image to a first upsampled image using parameters to sharpen edges in the source image at a first level of sharpness;
    upsampling the source image to a second upsampled image using parameters to sharpen edges in the source image at a second level of sharpness that is less than the first level of sharpness, wherein the upsampling of the source image to the second upsampled image is performed using:

$$h(n) = \cos^\omega\left(\frac{\pi n}{2m}\right) \cdot \frac{\sin(kn)}{kn},$$

where k comprises a dilation determined by an upsampling ratio of the source image, m is the value of n where the sinc function is nullified, and ω is a contour tuning parameter;

deblurring the first and second upsampled images using deconvolution;

bounding pixels in the deblurred, second upsampled image to values within a maximum and a minimum based on values of pixels in a neighborhood for each respective upsampled pixel in the second upsampled image;

denoising the deblurred, first upsampled image;

applying an edge detector to the denoised, first upsampled image to produce a binary edge mask image having defined edges;

dilating the binary edge mask image to expand the binary edge mask image to cover pixels immediately adjacent to the defined edges; and applying a blur to the intermediary edge mask image to produce a deep mask image; and blending the deblurred, first upsampled image and the bounded second upsampled image into a resampled image using the deep mask image.

16. The method of claim 15, further comprising denoising the source image prior to upsampling the source image to a first and a second upsampled image.

17. The method of claim 15, wherein
the contour tuning parameter used for the upsampling of the image source to the second upsampled image is larger than one, ω>1.

18. A system for resampling a digital image, comprising:
memory storing instructions;
one or more processors coupled to the memory and configured to execute the instructions to perform operations comprising:
presharpening a source image using a first level of presharpening to a first presharpened image, and presharpening the source image using a second level of presharpening that is less than the first level of presharpening to a second presharpened image;
upsampling the first presharpened image to a first upsampled image having a specified image size, and upsampling the second presharpened image to a second upsampled image having the specified image size, wherein the operations of upsampling the first and second presharpened images is performed using a damped, tunable convolution kernel h(n) defined by:

$$h(n) = \cos^\omega\left(\frac{\pi n}{2m}\right) \cdot \frac{\sin(kn)}{kn},$$

where k comprises a dilation determined by an upsampling ratio of the first and second presharpened images, m is the value of n where the sinc function is nullified, and ω is a contour tuning parameter;

deblurring the first upsampled image;
deblurring the second upsampled image;
generating a binary edge mask image from the deblurred, first upsampled image;
dilating the binary edge mask image;
blurring the dilated binary mask image to provide a deep mask image; and blending the first and second, deblurred upsampled images into an upsampled source image using the deep mask image.

19. The system of claim 18, where the one or more processors are configured to execute the instructions to perform operations comprising bounding a value of an upsampled pixel in the second upsampled image within a maximum and a minimum based on values of pixels in a neighborhood of pixels for the upsampled pixel.

20. The system of claim 19, where the one or more processors are configured to execute the instructions to perform operations comprising adjusting the second upsampled image based on a variance factor defined by a variance of the neighborhood of pixels.

21. The system of claim 18, wherein dilating the binary edge mask image includes adding mask pixels adjacent to currently set pixels by expanding the binary edge mask image to cover pixels immediately adjacent to edges.

22. The system of claim 18, where the one or more processors are configured to execute the instructions to perform operations comprising denoising the source image prior to the presharpening of the source image to the first and second presharpened images.

23. The system of claim 18, wherein blurring the dilated binary edge mask image includes blurring using a Gaussian blur.

24. The system of claim 23, where the one or more processors are configured to execute the instructions to perform operations comprising applying a Gamma curve to the dilated binary edge mask image.

25. The system of claim 18, where blending the first and second, deblurred upsampled images using the deep mask image into the upsampled source image G(x, y) is performed according to the following equation $$G(x,y)=M_n'(x,y)E'(x,y)+(1-M_n'(x,y))F'(x,y),$$

where the first deblurred, upsampled image comprises a function defined by E'(x, y), the second, deblurred, upsampled image comprises a function defined by F'(x, y), and the blurred binary mask comprises a function defined by M'(x, y).

26. The system of claim 18, wherein generating a binary edge mask image from the deblurred, first upsampled image comprises denoising the deblurred, first upsampled image.

27. The system of claim 18, wherein deblurring the first upsampled image or the second upsampled image includes deblurring using a Wiener deconvolution.

28. The system of claim 18, wherein
the contour tuning parameter used for the upsampling of the first and second presharpened images is larger than one, ω>1.

29. The system of claim 18, where the one or more processors are configured to execute the instructions to perform operations comprising:
receiving an upsampling ratio for upsampling the first and second presharpened images that is an irrational number;
converting the upsampling ratio into a rational number based on a continued fraction representation of the upsampling ratio; and
determining upsampling coefficients for a source pixel in the source image based on the converted upsampling ratio.

30. The system of claim of claim 29, where the one or more processors are configured to execute the instructions to perform operations comprising rendering the coefficients into integers.

31. The system of claim 29, where the one or more processors are configured to execute the instructions to perform operations comprising:
normalizing the coefficients; and
setting coefficients below a predetermined value to zero.

32. A system for upsampling a digital image, comprising:
memory storing instructions;
one or more processors coupled to the memory and configured to execute the instructions to perform operations comprising:
upsampling a source image to a first upsampled image using parameters to sharpen edges in the source image at a first level of sharpness;
upsampling the source image to a second upsampled image using parameters to sharpen edges in the source image at a second level of sharpness that is less than the first level of sharpness, wherein the operation of upsampling the source image to the second upsampled image is performed using:

$$h(n) = \cos^\omega\left(\frac{\pi n}{2m}\right) \cdot \frac{\sin(kn)}{kn},$$

where k comprises a dilation determined by an upsampling ratio of the source image, m is the value of n where the sinc function is nullified, and ω is a contour tuning parameter;
deblurring the first and second upsampled images using deconvolution;
bounding pixels in the deblurred, second upsampled image to values within a maximum and a minimum based on values of pixels in a neighborhood for each respective upsampled pixel in the second upsampled image;
denoising the deblurred, first upsampled image;
applying an edge detector to the denoised, first upsampled image to produce a binary edge mask image having defined edges;
dilating the binary edge mask image to expand the binary edge mask image to cover pixels immediately adjacent to the defined edges; and
applying a blur to the intermediary edge mask image to produce a deep mask image; and
blending the deblurred, first upsampled image and the bounded second upsampled image into a resampled image using the deep mask image.

33. The system of claim 32, where the one or more processors are configured to execute the instructions to perform operations comprising denoising the source image prior to upsampling the source image to a first and a second upsampled image.

34. The system of claim 32, wherein
the contour tuning parameter used for the operation of upsampling the image source to the second upsampled image is larger than one, ω>1.

* * * * *